US011916321B2

(12) United States Patent
Ruda

(10) Patent No.: US 11,916,321 B2
(45) Date of Patent: Feb. 27, 2024

(54) METHOD FOR PRODUCING A CONNECTOR PART FOR ELECTRICAL INSTALLATIONS, CONNECTOR PART, AND CONNECTION OF A CONNECTOR PART TO A CABLE

(71) Applicant: Auto-Kabel Management GmbH, Hausen (DE)

(72) Inventor: Matthias Ruda, Essen (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 187 days.

(21) Appl. No.: 17/291,212

(22) PCT Filed: Oct. 10, 2019

(86) PCT No.: PCT/EP2019/077434
§ 371 (c)(1),
(2) Date: May 4, 2021

(87) PCT Pub. No.: WO2020/094327
PCT Pub. Date: May 14, 2020

(65) Prior Publication Data

US 2021/0408701 A1 Dec. 30, 2021

(30) Foreign Application Priority Data

Nov. 7, 2018 (DE) ..................... 10 2018 127 729.6

(51) Int. Cl.
*H01R 11/12* (2006.01)
*H01R 43/02* (2006.01)
*H01R 43/16* (2006.01)

(52) U.S. Cl.
CPC ......... *H01R 11/12* (2013.01); *H01R 43/0249* (2013.01); *H01R 43/16* (2013.01)

(58) Field of Classification Search
CPC ..... H01R 11/12; H01R 43/0247; H01R 43/16
(Continued)

(56) References Cited

U.S. PATENT DOCUMENTS 2,468,169 A * 4/1949 Carison .................. H01R 4/206 72/347
6,206,432 B1 * 3/2001 Kamiyama ............. F16L 37/23 285/348

(Continued)

FOREIGN PATENT DOCUMENTS

DE 2249707 A1 4/1973
DE 200 18 287 U1 3/2001

(Continued)

OTHER PUBLICATIONS

International Searching Authority/EP, International Search Report and Written Opinion of the International Searching Authority, Application No. PCT/EP2019/077434, dated Jan. 30, 2020, (*In German, with English translation of the International Search Report*), 16 pages.

(Continued)

*Primary Examiner* — Peter G Leigh
(74) *Attorney, Agent, or Firm* — Sunstein LLP

(57) ABSTRACT

The subject matter relates to a method for producing a connection part for electrical equipment, in particular for an on-board electrical system of a motor vehicle, comprising: deep-drawing a sheet-metal blank to produce a sleeve having a first end region and a second end region, the first end region having a bottom and the second end region being open, deforming, in particular pressing, the second end region to produce a tab, and introducing a through-hole into the tab. The subject matter also relates to a connection part for electrical installations, in particular for an on-board network of a motor vehicle, and to a connection of a connection part according to any one of the preceding claims to a cable formed from a plurality of wires or strands.

7 Claims, 4 Drawing Sheets

(58) Field of Classification Search
USPC .......................................................... 439/883
See application file for complete search history.

(56) References Cited

U.S. PATENT DOCUMENTS

| | | | | |
|---|---|---|---|---|
| 7,887,380 | B2 * | 2/2011 | Ross | H01R 43/16 29/882 |
| 8,840,437 | B2 * | 9/2014 | Hentschel | H01R 4/029 439/874 |
| 2003/0124917 | A1 * | 7/2003 | Aoyama | H01R 11/12 439/860 |
| 2010/0014942 | A1 | 1/2010 | Ross | |
| 2013/0059473 | A1 | 3/2013 | Hentschel et al. | |
| 2017/0170580 | A1 * | 6/2017 | Ishihara | H01R 4/34 |

FOREIGN PATENT DOCUMENTS

| | | | | |
|---|---|---|---|---|
| DE | 10326004 | A1 * | 12/2004 | H01R 43/16 |
| DE | 102004050676 | A1 * | 4/2006 | H01R 11/12 |
| DE | 10 2007 005 810 | A1 | 7/2008 | |
| DE | 102007001525 | A1 * | 7/2008 | H01R 11/12 |
| DE | 10 2011 017 070 | A1 | 10/2012 | |
| DE | 102014208809 | A1 * | 11/2015 | F01L 1/181 |
| EP | 2621022 | A1 * | 7/2013 | H01R 11/12 |
| EP | 2662934 | A2 * | 11/2013 | H01R 4/625 |
| EP | 2662934 | A2 | 11/2013 | |
| JP | 2013-105648 | A | 5/2013 | |
| RO | 126513 | | 7/2011 | |
| WO | WO-2012107873 | A1 * | 8/2012 | H01R 11/12 |

OTHER PUBLICATIONS

German Patent Office, Office Action, Application No. 10 2018 127 726.6, dated Aug. 9, 2019, 5 pages (*in German*).

International Preliminary Examining Authority/EP, International Preliminary Examination Report, Application No. PCT/EP2019/077434, dated Feb. 10, 2021, 33 pages (*in German*).

* cited by examiner

METHOD FOR PRODUCING A CONNECTOR PART FOR ELECTRICAL INSTALLATIONS, CONNECTOR PART, AND CONNECTION OF A CONNECTOR PART TO A CABLE

CROSS-REFERENCE TO RELATED APPLICATIONS

This application is the national phase entry of international patent application no. PCT/EP2019/077434 filed Oct. 10, 2019 and claims the benefit of German patent application No. 10 2018 127 729.6, filed Nov. 7, 2018, the disclosures of which are incorporated herein by reference in their entirety.

TECHNICAL FIELD

The subject matter relates to a method for manufacturing a connection part for electrical installations, in particular for an on-board network of a motor vehicle. The subject matter also relates to a connection part for electrical installations and to the connection of a connection part to a cable formed from a plurality of wires or strands.

BACKGROUND ART

Nowadays, motor vehicles have an increasing number of electrical consumers in the course of electrification. For the electrical connection of electrical installations with the current-carrying lines or cables of a motor vehicle, connecting parts are usually used. Due to the increasing use of connectors and the enormous cost pressure, the requirements for connectors are becoming more and more stringent.

For example, the connectors must not only be particularly easy to connect to the current-carrying lines or cables of a motor vehicle, but should also have good electrical conductivity and be as light as possible. In addition, the manufacturing process of the connection parts should be cost-effective and reliable.

Due to the increasing number of electrical consumers and the resulting increase in the number of current-carrying lines and cables, small cable cross-sections are preferred and therefore connection parts with a small cross-section and a resulting small size are required.

In the prior art, it is known to stretch sheet material and then bend it to produce a connector. However, such a manufacturing process is disadvantageous in that the stretching—especially in the case of small connection parts—does not provide a sufficiently thick wall thickness of the connection part, which means that a welded connection with an electrical conductor or cable cannot be reliably produced.

It is also known to design a connection part in several parts. However, this is disadvantageous with regard to the mechanical load capacity of the connection part and leads to a resource-intensive assembly process.

On this basis, the subject matter was based on the task of specifying a method for manufacturing a connection part, a connection part and a connection of a connection part to a cable formed from several wires or strands, with which small geometries can be manufactured in a process-safe and cost-effective manner and a reliable connection to a cable is made possible.

SUMMARY OF THE INVENTION

This task is solved by a method for the production of a connection part, which comprises the following steps:

Deep-drawing a sheet metal blank to produce a sleeve having a first end region and a second end region, wherein the first end region has a bottom and wherein the second end region is open, forming, in particular pressing, the second end region to produce a tab, and making a through hole in the tab.

The deep drawing process makes it possible to produce a sleeve in a process-safe manner with only small tolerances. This is particularly advantageous for the production of connecting parts with small dimensions. Furthermore, the bottom of the first end area of the sleeve has small outer radii due to the deep-drawing process. This allows the bottom of the first end region to be advantageously connected to an electrical cable both mechanically and electrically by means of a weld seam. It is particularly advantageous if the weld seam is a friction weld seam, i.e. a weld seam created by means of a friction weld.

It is also possible to carry out a deep-drawing process as described above with a high number of pieces and low cycle times, which means that the connecting parts can be produced cost-effectively. The forming, in particular pressing, of the second end region to create a tab and the insertion of a through hole in the tab is also possible at low cost with high process reliability.

Furthermore, the connecting part is preferably designed as a single piece. This leads to an increased stability of the connecting part and also to low production costs, since complex assembly activities can be dispensed with.

According to an embodiment example, the second end region of the sleeve is formed, preferably pressed, in such a way that inner wall sides of the tab at least partially abut each other and the cross-section of the tab is formed substantially elliptically, wherein a wide plane defines the maximum cross-sectional width of the tab. The wide plane is preferably formed by the at least partially abutting inner wall sides of the tab. By crimping the second end region of the sleeve, a uniformly stable electrical contact can be ensured, for example in the case of a clamping contact on an electrically conductive component. By crimping, the size of the second end region of the connecting part can also be reduced, which is advantageous with regard to the required installation space.

A further embodiment example is characterised in that the through hole is made in the tab substantially orthogonal to the wide plane. The axis of the through hole is thus orthogonal to the wide plane of the tab. By means of such a through hole, the connecting part can be conveniently connected, for example, to an electric cable or to an electric consumer, in particular by means of a screw. It is preferred that the through hole is introduced substantially centrally in the wide plane of the tab and that the through hole is preferably formed substantially circularly.

According to a further embodiment example, the tab is deformed one or more times, preferably bent, in particular after insertion of the through hole. It is also preferred that the insertion of the through hole and the deformation of the tab are performed simultaneously in a combined bending/punching process. By deforming, in particular by bending, the tab, the connector can be adapted to different installation scenarios or the available installation space.

According to a further embodiment example, it is preferred that the tab is deformed, in particular bent, about an axis lying in the broad plane and running essentially in the transverse direction of the connection part. This makes it possible to ensure that the through hole is provided in the position planned in terms of design.

It is also preferred that the tab is bent several times, whereby the respective bending axes, i.e. those axes about which the tab is bent, are formed essentially parallel or transverse to the axis lying in the broad plane and running essentially in the transverse direction of the connecting part. Such bending operations make it possible to provide variable fastening possibilities for the connecting part, since the position of the through hole can be adapted to various kinds of installation scenarios.

According to a further embodiment example, it is preferred that the sleeve has a wall thickness of at least 1 mm after deep drawing. Thus, it can be ensured that the wall thickness of the bottom after further processing of the sleeve has a sufficient thickness so that it can be reliably connected to a cable by means of a welded connection, in particular with a friction welded connection.

Another aspect relates to a connection part for electrical installations, in particular for an on-board network of a motor vehicle, having a first end region and having a second end region, wherein the connection part is formed in one piece, wherein the first end region is formed as a closed, U-shaped tube section, wherein the second end region is formed as a tab having a substantially elliptical cross-section, and wherein the tab has a through-hole.

It is preferred that the closed, U-shaped pipe section is preferably composed of a substantially circular wall and a bottom which delimits the wall on the underside and is also substantially circular. Advantages of such a connection part have already been explained in connection with the method for manufacturing the connection part.

With regard to saving installation space, it is advantageous that the outer diameter of the first end region is larger than the outer diameter of the second end region. This is because the outer diameter of the first end region usually corresponds to the outer diameter of a cable to be connected. Thus, a smaller outer diameter of the second end region can both save installation space and increase the connection possibilities of the connecting part.

According to an embodiment example, it is proposed that a transition region is arranged between the first end region and the second end region and that the transition region substantially tapers from the first end region towards the second end region. It is preferred that the transition region tapers from the first end region towards the second end region. However, other types of tapering are also conceivable, for example a curved tapering.

With regard to a simple and reliable production of the connector, it is preferred that the first end region, the transition region and at least a part of the second end region are substantially mirror-symmetrical along the longitudinal axis of the connector. It is preferred that the entire second end region, with the exception of the deformed part of the tab, is also mirror symmetrical.

According to a further embodiment, it is preferred that the first end region has an outer diameter of at most 25 mm, in particular at most 8 mm. Such outer diameters can be realised in particular by deep-drawing a sheet metal blank with only small tolerances, so that small connection parts can be manufactured which correspond correspondingly to small cable diameters. Small connection parts are also advantageous with regard to material costs and the consumption of installation space.

With regard to the welding and forming properties of the connector, it is advantageous if it is made of aluminium, copper, an aluminium alloy or a copper alloy.

The connector can be manufactured particularly cost-effectively if it is a tubular cable lug. Tubular cable lugs are particularly in demand as a mass product.

A further aspect relates to a connection of a aforementioned connector to a cable formed from a plurality of wires or strands, wherein the cable is enclosed by a support sleeve for receiving an end face of the cable such that the wires or strands of the cable are held in the support sleeve, and wherein the end face of the first end region of the connector is welded to the end face of the cable and/or the end face of the support sleeve by means of a weld seam. By deep-drawing the aforementioned connection part, a sufficient bottom thickness for a reliable welded connection can be provided. Due to the closed design of the bottom of the connection part, the connection part is connected to the cable in a longitudinally sealed manner, whereby an entry of liquid, for example due to capillary forces, into the cable can be reliably prevented.

With regard to technical production aspects, it is also advantageous if the weld seam is a friction weld seam, i.e. it is created by means of a friction weld joint between the end face of the first end region of the connection part and the end face of the cable and/or the end face of the support sleeve. Preferably, the connection part is rotated during the welding process. In particular, it is preferred that the friction welded connection of the end face of the first end portion is with both the end face of the cable and the end face of the support sleeve. The friction weld may be a rotational friction weld.

A further embodiment is characterised in that the end face of the cable is substantially flush with the end face of the support sleeve. The end face of the cable is preferably formed by the ends of the wires or strands. This allows a reliable friction weld connection to be made with both the cable and the support sleeve.

According to a further embodiment, it is advantageous that the cable is stripped in the area of the support sleeve. This enables a reliable electrical connection between the cable and the support sleeve.

BRIEF DESCRIPTION OF THE DRAWINGS

In the following, the object is explained in more detail with reference to a drawing showing examples of embodiments. The drawing shows.

DETAILED DESCRIPTION OF SPECIFIC EMBODIMENTS

In the following description of the various embodiments, components and elements with the same function and the same mode of operation are given the same reference signs, even if the components and elements may differ in dimension or shape in the various embodiments.

Figure 1A:
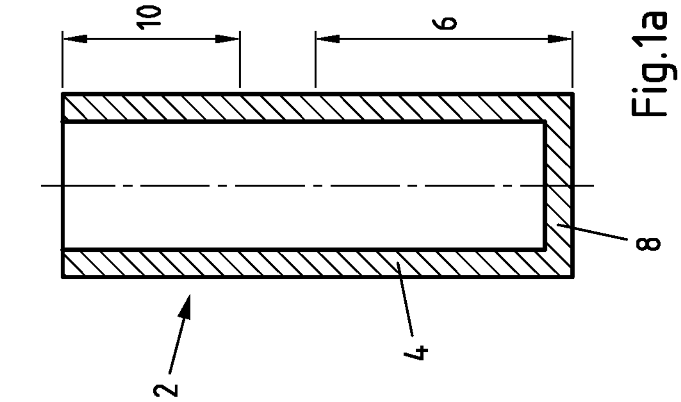
FIG. 1*a* a side view of an embodiment example of a sleeve during a subject process after deep drawing in section, FIG. 1*b* a front view of the example of the sleeve shown in FIG. 1*a* after deep drawing, FIG. 2*a* a side view of the embodiment example of the sleeve shown in FIGS. 1*a* and 1*b* after pressing in section, FIG. 2*b* a front view of the embodiment example of the sleeve shown in FIG. 2*a* after pressing, FIG. 3*a* a top view of the previously illustrated embodiment example of the sleeve after insertion of a through hole, FIG. 3*b* a rotated front view of the embodiment example of the sleeve shown in FIG. 3*a* after insertion of the through hole, FIG. 4*a* a first process step of joining an embodiment example of the subject connector to a cable by means of a rotational friction welding process in a side view, FIG. 4*b* a second process step of the joining shown in FIG. 4*a*, FIG. 4*c* a third process step of the joining shown in FIGS. 4*a* and 4*b*, FIG. 5*a* a side view of an embodiment of the connection part in question, FIG. 5*b* a top view of the example of the connector shown in FIG. 5*a*, FIG. 6*a* a side view of a further example of the connection part in question.

FIG. 1*a* shows a side view of an embodiment example of a sleeve 2 during a subject process after deep drawing. The sleeve 2 is tubular and has a substantially circular wall 4. This can be seen in the front view of the sleeve 2 shown in FIG. 1*b*. Furthermore, the sleeve comprises a first end region 6, which has a bottom 8, and a second end region 10, which is open. The sleeve 2 has a substantially U-shaped cross-sectional profile and is preferably formed of copper, aluminium or alloys thereof. The wall thickness of the sleeve 2 is preferably at least 1 mm.

Figure 2A:
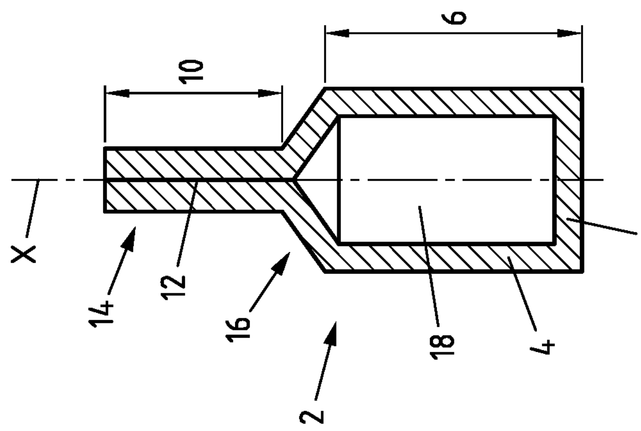
Figure 2B:
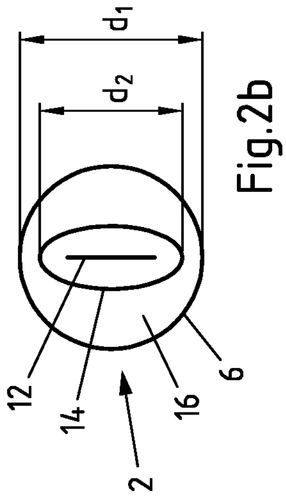
Figure 1B:
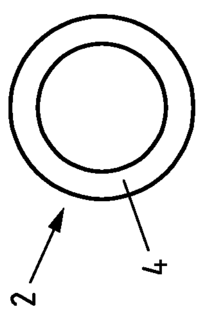

FIG. 2*a* shows a side view of the embodiment example of the sleeve 2 shown in FIGS. 1*a* and 1*b* after pressing. It can be seen that the inner walls 12 or the inner lateral surface of the wall 4 are substantially in contact with each other in the second end region 10. As a result of the pressing, a tab 14 with a substantially elliptical cross-section has formed in the second end region 10 (cf. FIG. 2*b*). The first end region 6 tapers substantially conically by means of a transition region 16 and then merges into the second end region 10 or the tab 14. The transition area 16 and the first end area 6 enclose an internal cavity 18. In FIG. 2*b* it can further be seen that the outer diameter d1 of the first end region 6 is larger than the outer diameter d2 of the second end region 10 or the tab 14. Preferably, the outer diameter d1 is at most 10 mm, in particular at most 8 mm.

Figure 3A:
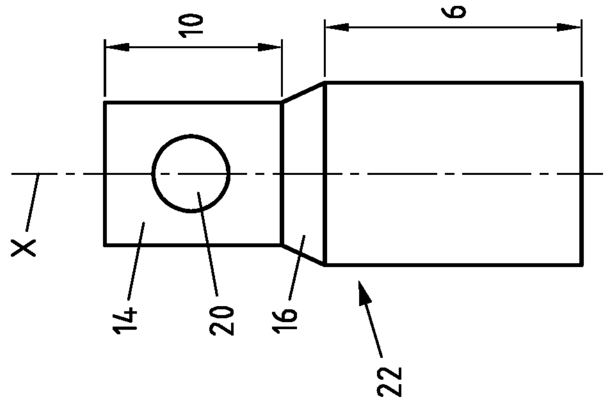
Figure 3B:
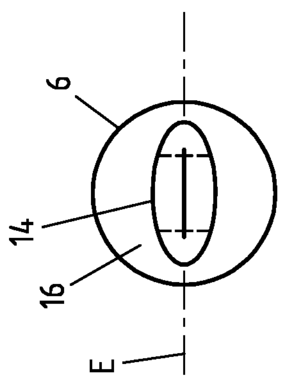

In FIG. 3*a*, a top view of the previously illustrated embodiment example of the sleeve 2 is shown after the insertion of a through hole 20. After inserting the through hole 20, all process steps have been completed, so that a connecting part 22 has now been produced. The through hole 20 is inserted centrally in a wide plane E of the tab 14. The wide plane E of the tab 14 is shown in FIG. 3*b* and runs along the maximum cross-sectional width of the tab 14. The longitudinal axis X of the connecting part 22 preferably runs centrally through the through-hole 20.

Figure 4C:
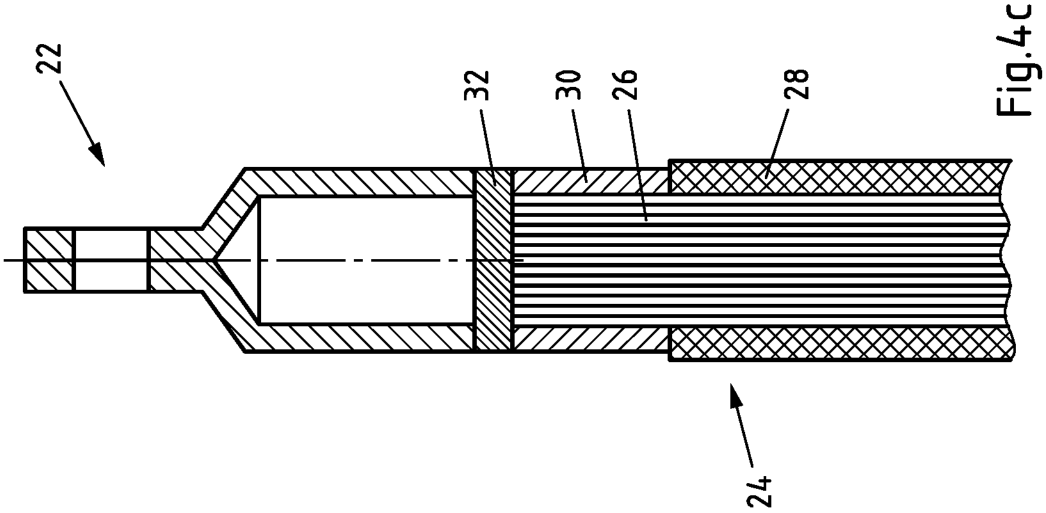
Figure 4B:
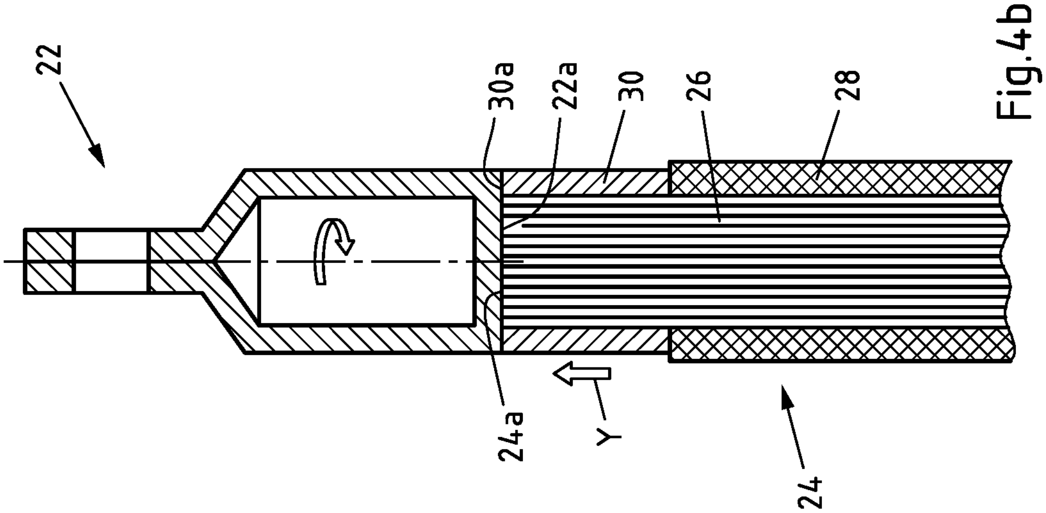
Figure 4A:
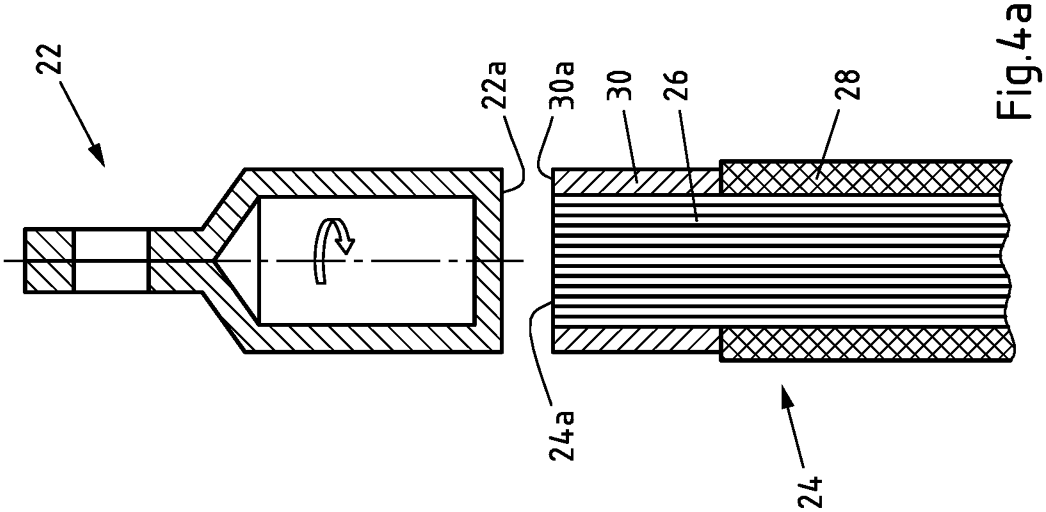

FIGS. 4*a* to 4*c* show the connection of a subject connector 22 to a cable 24 by means of a rotation friction welding process. The cable 24 is preferably a battery cable of a motor vehicle, in particular for connecting a battery to a starter, a generator or also to another electrical line of a motor vehicle. The cable 24 is composed of a plurality of strands or wires 26 sheathed in insulation 28. In the end region of the cable 24, the insulation 26 is removed so that the wires 26 are exposed and enclosed by a support sleeve 30. The support sleeve 30 is preferably round and formed of aluminium, copper or alloys thereof. It can be seen that the end face 30*a* of the support sleeve 30 is flush with the end face 24*a* of the cable 24.

Preferably, the support sleeve 30 is crimped so that the wires 26 are close together within the support sleeve 30. In a first process step of the rotational friction welding process, the connector 22 is rotated whereas the cable 24 is rotationally fixed in a holder (not shown).

In the process step shown in FIG. 4*b*, the connection part 22 is brought into contact with the cable 24 in such a way that the end face 22*a* of the connection part 22 comes into contact with the end face 30*a* of the support sleeve 30 and the end face 24*a* of the cable 24. To do this, the cable 24 is moved towards the connection part 22 in the direction of the arrow Y.

Due to the rotation of the connector 22, friction occurs between the connector 22 and the cable 24 or the support sleeve 30, which causes the materials in contact with each other to heat up and plasticise. This causes the connection part 22 to be welded to the cable 24 and to the support sleeve 30 by means of a friction weld 32. FIG. 4*c* shows a corresponding friction weld 32.

In FIGS. 5*a* to 8*b*, various examples of embodiments of a connection part 22 are shown. The connecting parts 22 differ only in the bending processes to which they have been subjected. It is possible to provide the bending processes simultaneously with the insertion of the through hole 20 or after the insertion of the through hole 20.

Figure 5B:
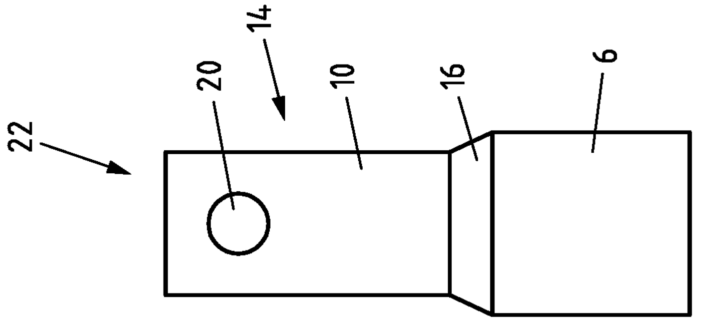
Figure 5A:
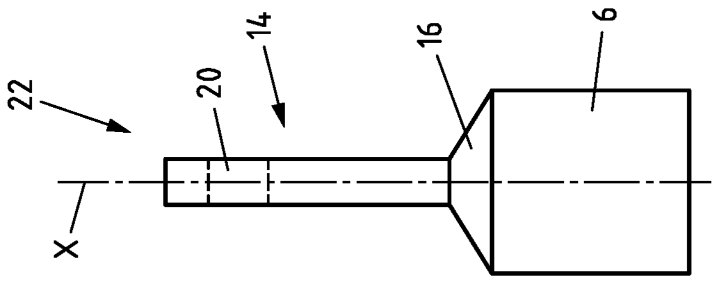

The connection part 22 shown in FIGS. 5*a* and 5*b* has not been subjected to any bending process. It thus corresponds essentially to the connection part 22 shown in FIGS. 3*a*, 3*b* and 4*a* to 4*c*.

Figure 6B:
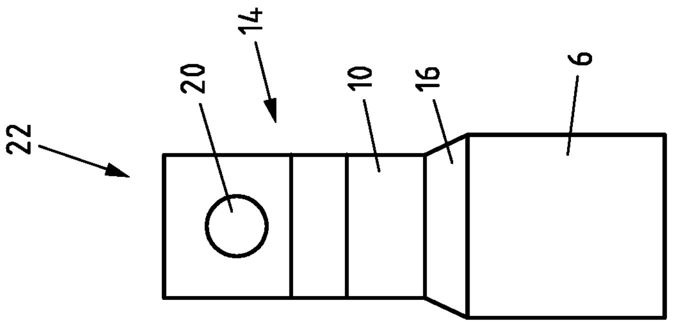
FIG. 6*b* is a top view of the example of the connector shown in FIG. 6*a*, FIG. 7*a* a side view of a further example of the connection part in question.
Figure 6A:
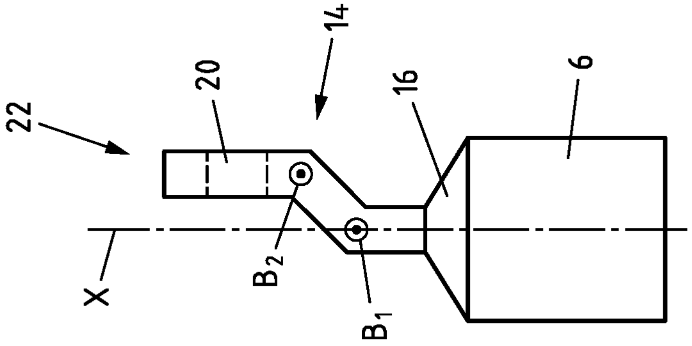

The connection part 22 shown in FIGS. 6*a* and 6*b* or the tab 14 of the connection part 22 was bent around two bending axes B1 and B2. It can be seen that the bending axes B1 and B2 run in the transverse direction of the connection part 22, with the bending axis B1 lying in the plane E shown in FIG. 3*b* and the bending axis B2 extending parallel to the bending axis B1. The double bending of the tab 14 allows for an offset screw-on surface for the through hole 20, with the axis passing through the through hole 20 continuing to run in the transverse direction of the connector part 22.

Figure 7B:
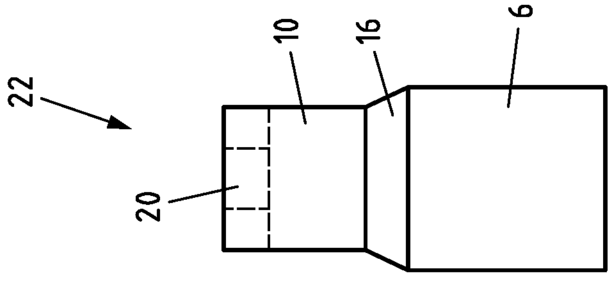
FIG. 7*b* is a top view of the example of the connector shown in FIG. 7*a*, FIG. 8*a* a side view of a further example of the connection part in question.
Figure 7A:
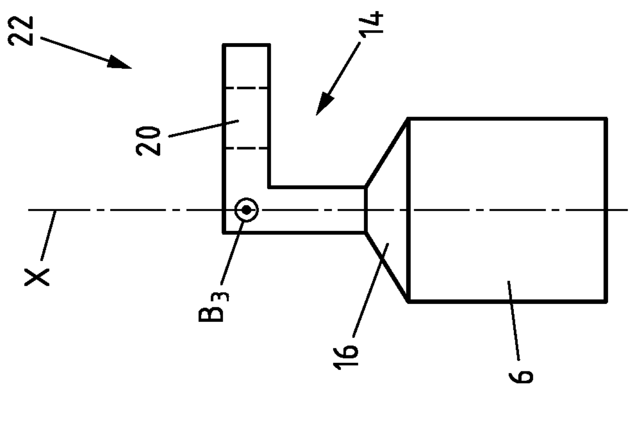

The embodiment example of the connector part 22 shown in FIGS. 7*a* and 7*b* has been bent substantially 90° about a bending axis B3, so that the axis running through the through hole 20 extends substantially parallel to the longitudinal axis X of the connector part 22.

Figure 8B:
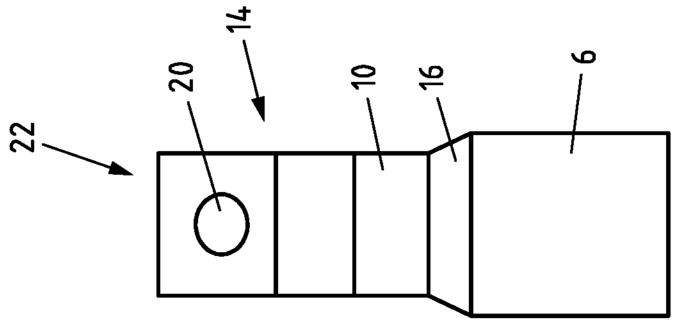
FIG. 8*b* is a top view of the example of the connection part shown in FIG. 8*a*.
Figure 8A:
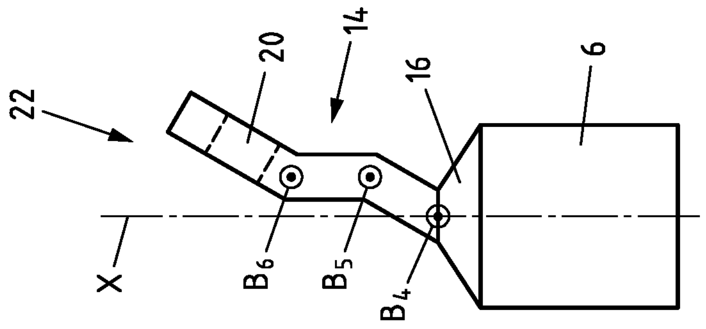

FIGS. 8*a* and 8*b* show a connector 22 whose tab 14 has been bent around a total of three bending axes B4, B5 and B6. This allows the lug 14 to be adapted to special structural conditions. It can be seen that the axis running through the through hole 20 is oblique to the longitudinal and the transverse axis of the connecting part 22.

What is claimed is:

1. A method of manufacturing a connection part for electrical installations, in particular for a board net of a motor vehicle, comprising:

deep-drawing a sheet metal blank to produce a sleeve having a first end region and a second end region, wherein the first end region has a closed bottom at its end face facing away from the second region and wherein the second end region has an open end face facing away from the first region, forming, in particular pressing, the second end region to produce a lug.

2. The method according to claim 1
wherein a through hole is introduced in the lug.

3. The method according to claim 2, wherein
the second end region of the sleeve is formed in such a way that wall inner sides of the lug at least partially abut one another and the cross-section of the lug is formed substantially elliptically, a wide plane defining the maximum cross-sectional width of the lug.

4. The method according to claim 3, wherein
the through hole is introduced in the lug substantially orthogonally to the wide plane.

5. The method according to claim 3, wherein
the lug is deformed, in particular bent, about an axis lying in the wide plane and running essentially in the transverse direction of the connection part.

6. The method according to claim 2, wherein
the lug is deformed one or more times, preferably bent, in particular after the through hole has been introduced.

7. The method according to claim 1, wherein
the sleeve after deep drawing has a wall thickness of at least 1 mm.

* * * * *